United States Patent
Ponnuswamy et al.

(10) Patent No.: US 11,601,425 B1
(45) Date of Patent: *Mar. 7, 2023

(54) MAINTAINING DUAL-PARTY AUTHENTICATION REQUIREMENTS FOR DATA RETENTION COMPLIANCE WITHIN A DISTRIBUTED SERVER ENVIRONMENT

(71) Applicant: EMC IP Holding Company LLC, Hopkinton, MA (US)

(72) Inventors: Senthil Ponnuswamy, San Jose, CA (US); Marcelo Vinante, Georgetown, TX (US); Anjali Anjali, Sunnyvale, CA (US); Anurag Sharma, Cedar Park, TX (US); Rekha Sampath, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 734 days.

This patent is subject to a terminal disclaimer.

(21) Appl. No.: 16/712,747

(22) Filed: Dec. 12, 2019

(51) Int. Cl.
*H04L 9/40* (2022.01)

(52) U.S. Cl.
CPC ........ *H04L 63/0876* (2013.01); *H04L 63/083* (2013.01); *H04L 63/102* (2013.01); *H04L 63/20* (2013.01)

(58) Field of Classification Search
CPC . H04L 63/0876; H04L 63/083; H04L 63/102; H04L 63/20; H04L 9/3226; H04W 12/069
See application file for complete search history.

(56) References Cited

U.S. PATENT DOCUMENTS

| | | | |
|---|---|---|---|
| 9,087,187 B1 * | 7/2015 | Doane | H04L 9/3236 |
| 2007/0011446 A1 * | 1/2007 | Kato | H04L 63/08 |
| | | | 713/150 |

OTHER PUBLICATIONS

Laura DuBois et al., "Backup and Recovery: Accelerating Efficiency and Driving Down IT Costs Using Data Deduplication," Feb. 2010, pp. 1-16. (Year: 2010).*

Michael T. Goodrich et al. "Auditable Data Structures," 2017 IEEE, pp. 285-300. (Year: 2017).*

* cited by examiner

*Primary Examiner* — Luu T Pham
*Assistant Examiner* — Canh Le
(74) *Attorney, Agent, or Firm* — Dergosits & Noah LLP; Todd A. Noah (57) ABSTRACT

Described is a system for maintaining dual-party authentication requirements for data retention compliance in a distributed storage environment that includes servers or nodes with remote access components. When administering a data retention policy, an operating system component may require a dual-party authentication mechanism to prevent data deletion, while a different authentication mechanism may control access to the remote access components. Access to the remote access component by a single privileged user, however, may enable overriding or compromising the retention lock compliance implemented by the operating system. Accordingly, the system may tie the dual-party authentication requirement to the authentication mechanism of the remote access components.

20 Claims, 7 Drawing Sheets

- 501 — Apply a retention lock to data stored by a storage system, the retention lock requiring a dual-party authentication to modify the data, the storage system including a first and second server each associated with a corresponding RAC allowing modification to a storage configuration associated with the storage system

- 502 — Receive, from the first authorized user, a request to enable a retention lock compliance mode

- 503 — Confirm credentials from the second authorized user, in response to the request to enable the retention lock compliance mode

- 504 — Disable existing user accounts associated with the remote access controller corresponding to a first server

- 505 — Create an administrative user account and a limited user account for the RAC corresponding to the first server, the administrative user account set to a disabled state and the limited user account set to an enabled state

- 506 — Save a user account configuration profile associated with the remote access controller corresponding to the first server

- 507 — Apply the saved user account configuration profile to at least a second server to disable existing user accounts associated with the RAC corresponding to the second server and create the administrative user account and the limited user account

- 508 — Activate the retention lock compliance mode for the first server and the second server, the retention lock compliance mode requiring the dual-party authentication to access either of the remote access controllers associated with the first sever or the second server

MAINTAINING DUAL-PARTY AUTHENTICATION REQUIREMENTS FOR DATA RETENTION COMPLIANCE WITHIN A DISTRIBUTED SERVER ENVIRONMENT

TECHNICAL FIELD

This disclosure relates to data storage systems, and more particularly, ensuring authentication mechanisms are maintained for securing retained data.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. In addition, as part of a data storage service, providers may provide tools for retaining data according to various data retention policies and regulations. For example, storage systems may ensure immutable copies of data are retained for a predefined amount of time. To provide such capabilities, storage systems may prevent the unauthorized deletion of data. For example, storage systems may implement procedures that require authentication from multiple parties before retained data may be deleted. Such an authentication requirement may be administered by certain operating system components of the storage system. However, due to the large number of interconnected components that may be implemented within a distributed storage environment, there is a potential that such authentication requirements may be circumvented when managing storage hardware. Consequently, changes to storage configurations may result in the inadvertent deletion of retained data. Thus, there is a continued need to provide mechanisms to ensure that data retention policies are maintained within distributed storage systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 5 is a flow diagram illustrating an example method of maintaining a dual-party authentication mechanism for accessing a remote access controller within a distributed storage environment according to one or more embodiments of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for maintaining dual-party authentication requirements for data retention compliance within a distributed storage environment. For example, as part of a data retention policy, a storage service may store data as a retention (or archival) copy of production data and ensure that such data is retained according to various standardized requirements (e.g. Securities and Exchange Commission (SEC) Rule 17a-4(f)). In addition, as part of the overall storage service, various tools to manage and monitor one or more storage servers may be available. For example, a storage server may include a remote access controller that allows a system administrator to perform various operations associated with storage components. The remote access controller, however, may use a different authentication mechanism than, for example, a filesystem that invokes a dual-party authentication mechanism to modify the retained data associated with a set of storage servers. Accordingly, access to the remote access controller may enable overriding or compromising the retention lock compliance implemented by the filesystem. Accordingly, in some embodiments, described is a system that ties the dual-party authentication requirement of the filesystem to the authentication mechanisms for accessing each remote access controller.

As described, the storage system may apply a retention lock to data that requires a dual-party authentication to modify (e.g. delete) the data. The storage system may also include remote access controllers that allows a privileged user (e.g. system administrator) to reconfigure storage components and/or storage volumes within the distributed environment. As a result of such reconfigurations, the underlying retained (or locked) data may be deleted by the single privileged user of the remote access controller. To prevent such a circumvention of a dual-party authentication requirement, the system may implement a retention lock compliance mode (or feature). For example, the retention lock compliance mode may reset (e.g. delete) all existing user accounts associated with the remote access controller and create new user accounts including an administrative and limited user account. In some embodiments, the limited user account may be limited to performing operations associated with restarting or powering-on the storage system using the remote access controller (e.g. in the event the operating system of the storage system crashes). The retention lock compliance mode, however, performs a specialized process (or workflow) to enforce a dual-party authentication requirement to access the remote access controller as the administrative user. As a result, a dual-party authentication requirement is preserved throughout aspects of the storage system to maintain data retention compliance.

In order to apply the retention lock compliance mode consistently across the distributed storage environment, the system may include a specialized configuration manager (or appliance configuration manager) that may be implemented as part of the storage system. For example, the configuration manager may propagate aspects of the specialized process to additional servers (or nodes) within the distributed storage environment. The configuration manager may also provide an interface for granting access to the created administrative users of the remote access controllers once the retention lock compliance mode is enabled. In addition, the configuration manager may monitor the retention lock compliance and automatically reapply configuration settings (or profiles) to ensure consistency throughout the distributed storage environment.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes backup and disaster recovery services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, hardware (e.g. Solid State Drive (SSD), Hard Disk Drive (HDD)), or on virtual storage systems provided by a cloud service provider, etc.

Figure 1:
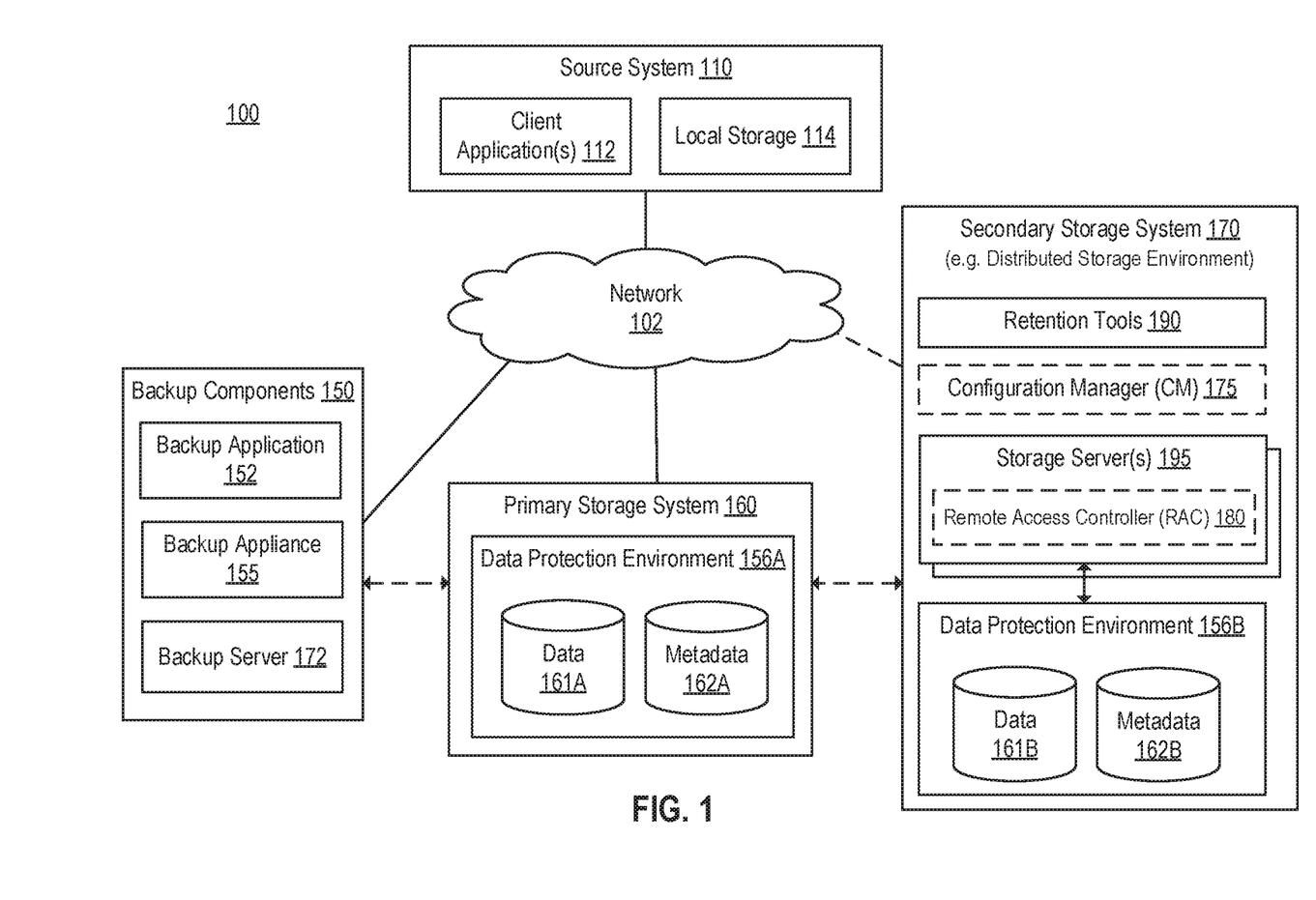
FIG. 1 is a block diagram illustrating an example operating environment for maintaining dual-party authentication policies for data retention according to one or more embodiments of the disclosure.

More specifically, and with reference to FIG. 1, shown is a block diagram illustrating an example of an operating environment 100 for maintaining dual-party authentication policies for data retention according to one or more embodiments of the disclosure.

In some embodiments, components of the operating environment 100 may provide data protection and recovery services to a client (or customer) associated with the source system 110. As further described herein, such services may include providing data retention services. For example, components of the secondary storage system 170 may store data 161B as a retention (or archival) copy of production data (e.g. data 161A), and ensure that data 161B is retained according to various standardized requirements (e.g. Securities and Exchange Commission (SEC) Rule 17a-4(f)).

As shown, the environment 100 may include a source system 110, backup components 150, a primary storage system 160, and a secondary storage system 170. It should be noted that the components of operating environment 100 may interact via a network 102, which may be any type of wired or wireless network including a local area network (LAN), a wide area network (WAN), or a direct communication link, or other suitable connection.

The source system (or client system) 110 may act as a client from which data to be protected originates. The source system 110 may host one or more client applications 112, and may include local storage 114, as well as an interface for communicating with other systems and devices, such as the storage systems 160/170. In general, the client applications 112 may create new and/or modified data that is desired to be protected, which may initially be stored locally in the local storage 114. As further described, the backed-up data can be securely retained within storage systems 160/170 according to any implemented retention policies.

The backup components 150 may include a backup application 152 that performs (or manages, coordinates, etc.) the creation and restoration of data that may be backed-up. For example, data to be backed-up from the source system 110 may be communicated from the source system 110 to the backup application 152 for initial processing, after which the processed data is uploaded from the backup application 152 for storage within a storage system 160/170 (e.g. as data 161). In some embodiments, the backup application 152 may cooperate with a backup client application of the source system 110 to back up client data to primary storage system 160. A backup application 152 may also cooperate with a backup client application to restore backup data from the storage systems 160/170 to the source system 110. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with Data Domain™ Restorer (DDR) storage devices. In some embodiments, the backup server 172 may be a Dell EMC Avamar server or a Dell EMC Networker server, although no particular server is required, and other backup and storage system configuration are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

As part of a data protection and recovery service, storage systems 160/170 may store data in a deduplicated manner. For example, each storage system 160/170 (e.g. in conjunction with backup components 150) may represent one or more components of a DDR-based deduplication storage system. Each storage system 160/170 may include a data protection environment 156, which stores data 161, and metadata 162 associated with the data 161.

In some embodiments, the secondary storage system 170 may be configured to provide replication (or recovery, mirroring, etc.) capabilities for the primary storage system 160. For example, the primary storage system 160 may include a first data protection environment 156A that includes a first instance of data (e.g. production data, or production backup data) 161A along with its associated metadata 162A, and the secondary storage system 170 may include a second data protection environment 156B that includes a second instance of data (e.g. recovery data, or recovery backup data) 162B along with its associated metadata 162B. As described, in some embodiments, the secondary storage system 170 may store data 161B as a retention (or archival) copy of production data (e.g. data 161A), and ensure that data 161B is retained according to various standardized requirements, which may include enforcing certain authentication policies (e.g. dual-party requirement) for modifying the data 161B. For example, modifying data may include any operations that alter the properties (e.g. contents, dates, metadata, filename, etc.) that may affect the integrity of the data. For example, preventing modifications may include preventing the deletion of data or its associated metadata.

In some embodiments, the operating environment 100 may include a production environment and a disaster recovery environment. For example, the primary storage system 160 may be part of a production environment (or production system), and the secondary storage system 170 may be part of a disaster recovery environment, both of which may provide data protection and recovery (or disaster recovery) services to a client (or customer). In some embodiments, the primary storage system 160 may be an on-premises system and the secondary storage system 170 may be part of a cloud-based system (or service). In some embodiments, the primary storage system 160 may also be provided as part of a cloud-based system (or service). However, in such scenarios, an entity (e.g. cloud service provider) providing the primary storage system 160 may be different than the entity (or entities) providing the secondary storage system 170.

As described, the secondary storage system 170 may ensure data 161B is secured and retained according to various policies required by a client (or customer). Accordingly, the secondary storage system 170 may include retention tools 190. The retention tools 190 may include various software components, APIs, libraries, classes, etc., to ensure that immutable copies of data 161B remain persistent for a predetermined amount of time. For example, the retention tools 190 may ensure that all the data 161B (e.g. files) that are locked for a time-based retention period cannot be deleted or overwritten under any circumstances until the retention period expires. To provide such capabilities, the tools may implement various features or policies such as requiring dual-party (or multi-party) authentication procedures for certain administrative actions. For example, a dual-party procedure may require verifying credentials of a regular administrative user plus a second authorized user (e.g. a "Security Officer") to perform certain administrative operations associated with the locked data. The dual-party authentication requirement may ensure that certain administrative actions are under the purview and control of a higher authority above and beyond an administrative user. In addition, the retention tools 190 may also implement various other policies such as disallowing operations that could compromise the state of locked data, securing the system clock from illegal updates, audit logging for any operations that are executed upon the locked data, disabling various "doors" of access that could compromise the state of the locked data or the state of the retention attributes, or other security policies. In some embodiments, the retention tools 190 may include Dell EMC Data Domain Retention Lock® (DD Retention Lock) components, although any suitable set of tools are contemplated. In some embodiments, retention tools 190 may be compatible with various industry-standards, such as NAS-based (CIFS, NFS) Write-Once-Read-Many (WORM) protocols.

The secondary storage system 170 may include a distributed storage environment. For example, a set of storage servers (or servers) 195 may be used to create, or work in conjunction with, the data protection environment 156B. In some embodiments, the secondary storage system 170 may include a clustered storage environment (or a distributed file system). For example, the clustered storage environment may include, or represent, a group of linked nodes, which may be configured to share resources. The shared resources may include server resources (e.g. processors and memory), storage resources (e.g. persistent data storage), and network resources (e.g. traffic bandwidth). Further, the sharing of any resource may entail virtualizing the resource in each node to create a logical pool of that resource that spans, and is made available to all nodes across the clustered storage environment. In some embodiments, each node of clustered storage environment may represent a storage server 195. As another example, the secondary storage system 170 may include a set of storage servers 195 that each manage a set (or array) of storage components (or devices) that store the data 161B. Irrespective of the configuration of the distributed storage environment, at least one of the storage servers 195 may function (or be designated) as a management server (or node). For example, the management server (or node) may configure additional components (e.g. storage servers 195) that may be added to the secondary storage system 170.

In some embodiments, one or more storage servers 195 may also include (or be associated with) a remote access controller (RAC) 180. A remote access controller 180 may provide an additional (e.g. remote) access mechanism to operate (control, access, configure, manage, etc.) hardware or software components associated with the storage server 195.

In some embodiments, the remote access controller 180 may include the Dell Remote Access Controller (DRAC), or functionally similar product, for providing an out-of-band management platform on certain platforms (e.g. Dell EMC PowerEdge server platform). In addition, in some embodiments, the remote access controller 180 may be provided on a separate expansion card, or integrated into the main board of a storage server 195. For example, the remote access controller 180 may also include the Integrated Dell Remote Access Controller (iDRAC). In addition, in some embodiments, the remote access controller 180 may be provided as part of a baseboard management controller (BMC). For example, the BMC may be a specialized service processor that monitors the physical state of the storage server 195 using sensors and communicates with a system administrator through an independent network connection.

When utilized, the remote access controller 180 may allow a system administrator (or other privileged user) to perform operations associated with one or more storage servers 195 that provide the data protection environment 156B. In some embodiments, the remote access controller 180 may be operable from a network-based interface (e.g. browser) to manage and monitor hardware such as storage components associated with the one or more storage servers 195. For example, the remote access controller 180 may have to ability to operate and configure functions related to power management, virtual media access, and remote console capabilities. Accordingly, the remote access controller 180 may allow a user to modify a storage configuration (or settings, options, etc.) associated with the secondary storage system 170. In addition, the remote access controller 180 may provide a user with various administrative capabilities to access functionality of an operating system associated with one or more storage servers 195. In some embodiments, the remote access controller 180 may include one or more resources (e.g. physical components) that are distinct from storage server 195 resources. For example, the remote access controller 180 may have its own processor, memory, network connection, and access to the system bus of the storage server 195 that allows performing operations associated with a storage server 195 using its own components. For example, with the remote access controller 180 enabled and using its own separate network connection, a user may log in and reboot the storage server 195 even if the operating system is unavailable (e.g. has crashed).

A configuration manager 175 may coordinate (or manage, orchestrate, automate, etc.) a process for ensuring certain authentication requirements remain consistent throughout the distributed environment. The configuration manager 175 may be part of, or work in conjunction with, an operating system of a storage system. For example, the configuration manager 175 may monitor various components and ensure the required authentication mechanisms are applied to new servers or nodes (e.g. storage servers 195) that are added to the environment, and reapply authentication mechanisms when server hardware is modified as further described herein. In some embodiments, the configuration manager 175 may provide an interface (e.g. web-based interface) that allows an administrative user to configure, monitor, and upgrade the distributed storage environment. In some embodiments, the configuration manager 175 may be part of the secondary storage system 170 as shown. For example, the configuration manager 175 may be a specialized server or may be part of a storage server 195. For instance, the configuration manager 175 may be part of a management server (or node) as described above. In some embodiments, the configuration manager 175 may be executed by (e.g. embedded on) one or more nodes of a distributed (or clustered) storage environment to maintain a high degree of availability and provide the ability to continue operating if one or more nodes fail. Alternatively, the configuration manager 175 may execute on one or more dedicated nodes that are distinct from nodes that are part of the storage filesystem of the distributed storage environment.

In some embodiments, the configuration manager 175 may direct (or control, initiate, etc.) other components of the secondary storage system 170 such as the remote access controller 180 (or related service modules), or an operating system of the secondary storage system 170, to perform various operations.

As described, the secondary storage system 170 may include multiple authentication mechanisms for a storage server 195 as further described with reference to FIG. 2.

Figure 2:
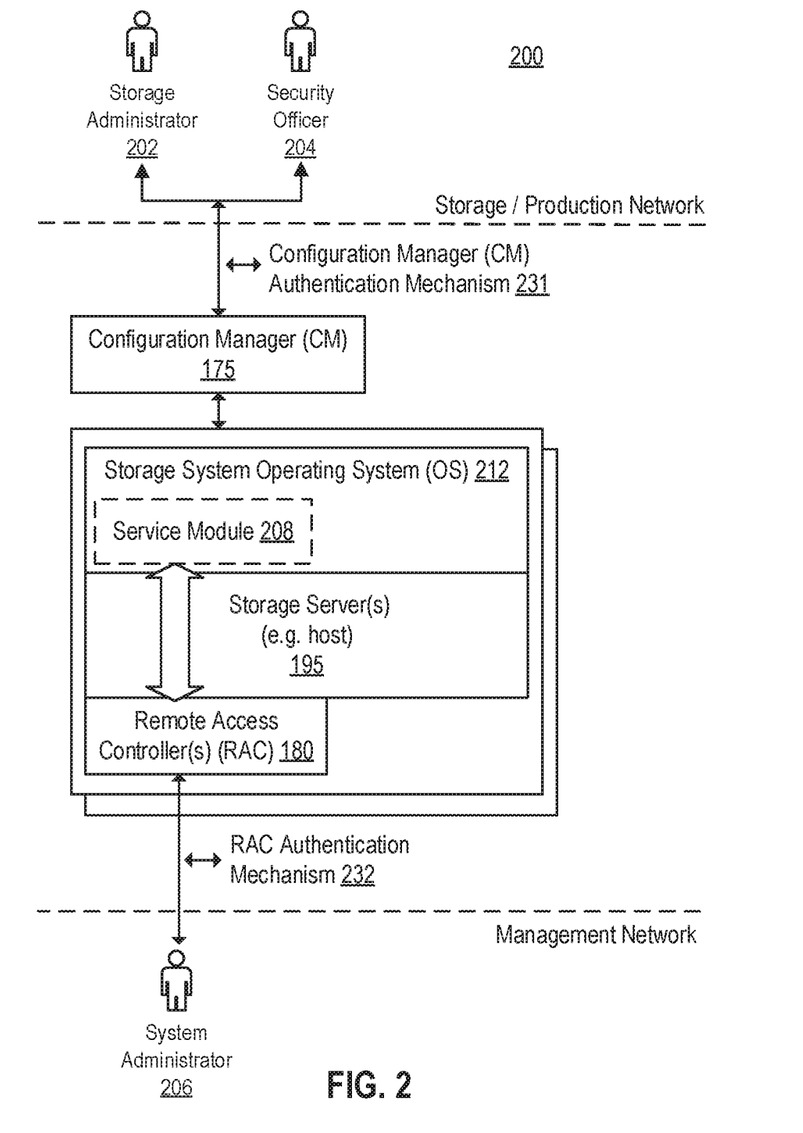
FIG. 2 is a diagram illustrating an example representation of the authentication mechanisms within a storage system according to one or more embodiments of the disclosure.

FIG. 2 is a diagram 200 illustrating an example representation of the authentication mechanisms within a storage system according to one or more embodiments of the disclosure.

As shown, a storage server 195 (or host system, device, computer, etc.) may operate in conjunction with a storage system operating system (OS) 212. As described, the storage server 195 may include (or work in conjunction with) a remote access controller 180. For example, the remote access controller 180 may allow a user to modify a storage configuration associated with one or more storage servers 195. A service module 208 may work in conjunction with the remote access controller 180. For example, the service module (or agent, API, etc.) 208 may expand the management capabilities of the remote access controller 180 to operations performed by the storage system OS 212 or the configuration manager 175. Accordingly, in some embodiments, the service module 208 may include a process (e.g. daemon) that executes as part of the storage system OS 212. For example, the service module 208 may be an iDRAC Service Module (iSM), or functionally similar product.

As shown, a storage administrator 202, and a security officer 204 may access the storage server 195 from a storage/production network. For example, a storage (or database) administrator 202 may include a user responsible for managing (or configuring, operating, etc.) storage configurations and settings associated with the storage server 195. As described, a security (or compliance) officer (or user) 204 may provide a supervisory level authentication beyond an administrative user. For example, a dual-party procedure may require verifying credentials of a regular administrative user (e.g. storage administrator 202) plus the security officer 204 to perform certain administrative operations associated with the retained (or locked) data. Accordingly, the dual-party authentication requirement may ensure that certain administrative actions are under the purview and control of a higher authority above and beyond an administrative user.

As shown, access, from the storage/production network, to one or more storage servers 195 of a distributed storage environment may be provided via the configuration manager 175. For example, direct access to the storage system OS 212 may be locked (or disabled) to retain the integrity of the distributed storage environment. For example, a native login provided by the storage system OS 212 may be disabled and a custom interface may be provided to ensure the dual party authentication requirements. In some embodiments, access to the distributed storage environment may be granted by a configuration manager (CM) authentication mechanism 231. The CM authentication mechanism 231 may be administered (or provided, enforced, implemented, invoked, etc.) by the configuration manager 175 (e.g. in conjunction with the storage system OS 212). In some embodiments, the configuration manager 175 may work in conjunction with a filesystem of the storage system OS 212 to administer the CM authentication mechanism 231. In addition, in some embodiments, the security features of the CM authentication mechanism 231 may be provided by hardware (e.g. resources) that provide the distributed storage environment. For example, the CM authentication mechanism 231 may be executed by one or more processors (or CPUs) executing the storage system OS 212 of the distributed storage environment.

Additionally, as shown, a system administrator 206 may access the storage server 195 from at least a management network. For example, a system (or network management) administrator 206 may include a user responsible for managing the server, network, or storage hardware associated with the storage server 195. In some embodiments, the system administrator 206 may include a support user (e.g. as part of support services offered by a storage provider). In some embodiments, the system administrator 206 may access the remote access controller 180 via a dedicated network connection/component. It should be noted that both a storage administrator 202 and a system administrator 206 may be considered an administrative or privileged user. In addition, such a user (or associated user account) may correspond to the same party (e.g. user or person), or a different party (e.g. user or person). However, to provide an additional layer of security, a security officer 204 may be a different party (or user or person) than the storage administrator 202 and system administrator 206.

A shown, access to the remote access controller 180 may be granted by a remote access controller authentication mechanism 232. As described, the remote access controller authentication mechanism 232 may be administered by components (e.g. software/hardware) that are different than the components that administer the CM authentication mechanism 231. As further described herein, in some embodiments, the configuration manager 175 may provide a specialized interface that allows a newly created administrative user (e.g. new system administrator 206) to access the remote access controller 180 for a limited duration once a retention lock compliance mode is activated. In some embodiments, the remote access controller 180 may execute on a separate processor (or CPU) than the one or more processors that execute the storage system OS 212. Accordingly, the RAC mechanism 232 may be administered by a processor that is different than the processor administering the CM authentication mechanism 231. For example, the RAC authentication mechanism 232 may be administered by a baseboard management controller (BMC) that provides (or works in conjunction with) the remote access controller 180.

As described, based on the capabilities of the remote access controller 180, a privileged user (e.g. system administrator) may perform various operations that may affect the integrity of retained data managed by a storage server 195. For example, the privileged user may reconfigure storage components and/or storage volumes that store or reference the retained data. As a result of such reconfigurations, the underlying retained data, which may be locked (e.g. subject to a dual-party authentication policy for retention), may be deleted (e.g. maliciously or inadvertently) by the single privileged user of the remote access controller 180.

Accordingly, due to the high degree of access afforded to a single privileged user of the remote access controller 180, in some embodiments, described is a specialized configuration that ensures authentication mechanisms are preserved throughout aspects of the storage system as further described with reference to FIG. 3.

Figure 3:
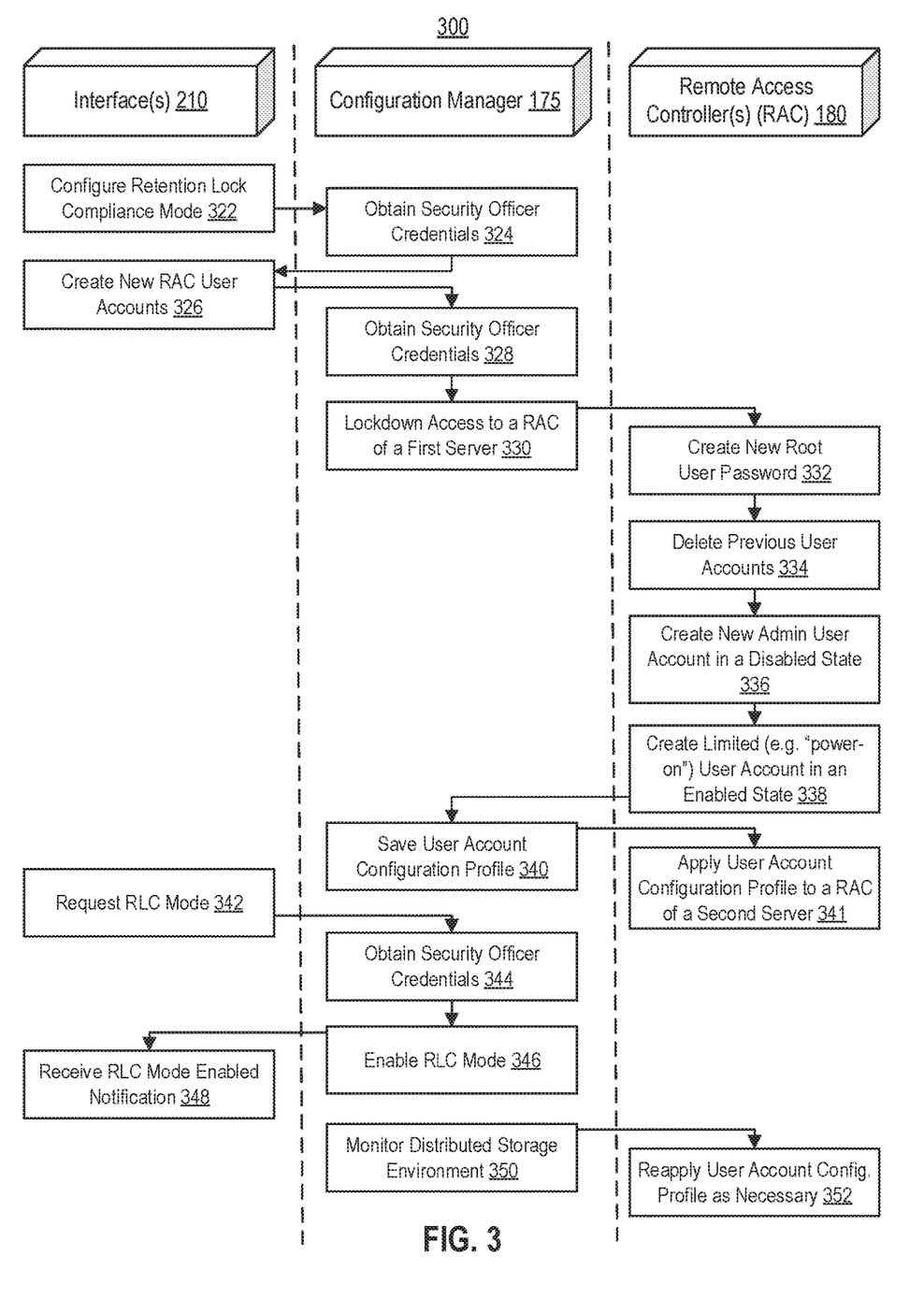
FIG. 3 is a process flow diagram illustrating an example interaction between components for enabling a retention lock compliance mode within a distributed storage environment according to one or more embodiments of the disclosure.

FIG. 3 is a process flow diagram 300 illustrating an example interaction between components for enabling a retention lock compliance mode within a distributed storage environment according to one or more embodiments of the disclosure.

In some embodiments, maintaining a dual-party (or multiparty) authentication requirement for modifying retention data (or locked data) may be implemented by enabling a retention lock compliance mode (or feature). As shown, enabling a retention lock compliance mode may involve an interaction between one or more interfaces 210, a configuration manger 175, and one or more remote access controllers (RACs) 180.

In some embodiments, the configuration manager 175 may be part of, or work in conjunction with, the storage system OS (e.g. storage system OS 212). For example, described operations performed by the configuration manager 175 may be performed in conjunction with the storage system OS.

In some embodiments, the interface 210 may include multiple interfaces. For example, the interface 210 may include a storage administrator interface that allows a storage administrator (e.g. storage administrator 202) to request activation of the retention lock compliance mode. The interface 210 may also include an access interface, for example, provided by the configuration manager 175 that allows a newly created administrative user (e.g. system administrator 206) to access the remote access controller for a limited duration after the retention lock compliance mode is activated.

In some embodiments, the remote access controller 180 shown may include a first remote access controller that corresponds to a first server, and a second remote access controller that corresponds to a second server.

Returning to the shown process flow, in 322, a retention lock compliance mode may be configured via the interface 210. For example, an administrative user (e.g. first party) such as a storage administrator or system administrator, may provide configuration information after providing the appropriate credentials to access the configuration manager 175. For example, credentials may include a password, biometric, key, certificate, or any other form of secure information verifying the identity (or authorization) of the user. The configuration information may include various settings (or options) such as a duration for enabling access by an administrative user to the remote access controller, login and password information for remote access controller user accounts, and other relevant settings. In response to initiating the configuration of the retention lock compliance mode, in 324, the configuration manager 175 may obtain security officer (e.g. second party) credentials. Accordingly, the configuration may not proceed until the credentials of the security officer are verified, and thus, ensuring a dual-party authentication requirement is preserved. As described, the security officer may ensure that certain administrative actions are under the purview and control of a higher authority above and beyond the administrative user.

Once the security officer credentials are verified, in 326, new remote access controller user accounts may be created for a first server. In some embodiments, the creation of the new user accounts for the remote access controller corresponding to the first server may be initiated by the administrative user via the interface 210. In 328, the configuration manager 175 may once again obtain security officer credentials in response to the request to create new user accounts. As part of the process to create new user accounts and enable a retention lock compliance mode, in 330, the configuration manager 175 may lockdown (or disable, lock, prevent, etc.) access to the remote access controller 180 of the first server. In some embodiments, the lockdown may prevent (e.g. lock) access to the remote access controller 180 by any existing user accounts and terminate any active user sessions connected to the remote access controller 180 corresponding to the first server. In some embodiments, the configuration manager 175 may first lockdown access to a first server, and then lockdown access to any remaining servers of the storage system that include remote access controllers. In some embodiments, the configuration manager 175 may send an instruction (e.g. via a service module 208) to the remote access controller 180, which then performs such a lockdown that may function as a reset of the existing user accounts allowed to access the remote access controller 180 as further described.

In some embodiments, the lockdown process may include a corresponding remote access controller 180 creating a new root user password in 332. In some embodiments, to limit the potential exposure of the root user password, the configuration manager 175 may periodically initiate the creation of new root user passwords. For example, the new root user passwords may be periodically reset once the retention lock compliance mode is enabled (e.g. after operation 346). In some embodiments, the root user password may only be known to the configuration manager 175 (or storage system OS), and thus, not exposed to external components.

In 334, the existing (e.g. previous) user accounts for the corresponding remote access controller 180 may be deleted (or disabled), which may include deleting any existing administrative (or privileged) user accounts. In addition to deleting the existing user accounts, any active user account sessions may also be terminated (or disabled, ended, etc.) to completely prevent access to the remote access controller 180.

In response to deleting the existing user accounts, in 336, a new administrative user account for the corresponding remote access controller 180 may be created. For example, the new administrative user account may be created with credential information (e.g. login/password) that may be provided as part of the configuration information provided by the administrative user via the interface 210. In some embodiments, the new administrative user account may be created in a disabled state. For example, access to the remote access controller 180 as an administrative user when the retention lock compliance mode is activated may require a dual-party authentication requirement as further described herein. In some embodiments, the new administrative user account may have certain restrictions (e.g. a "blacklisted" set of operations). For example, the new administrative user account may not be authorized to perform certain user management operations such as creating new user accounts, and updating or deleting existing user accounts associated with the remote access controller 180.

In addition to creating a new administrative user account, in 338, a limited user account for the remote access controller 180 corresponding to the first server may be created. For example, the limited user account may also be created with credential information (e.g. login/password) that may be provided as part of the configuration information provided by the administrative user via the administrator interface 210. In some embodiments, the limited user account may be created in an enabled state to perform a limited set of operations. For example, the limited user account may include a specialized user account that may perform a limited (or "whitelisted") set of operations. For example, the whitelisted set of operations may include allowing a user (e.g. "power-on" user) to rebooting (or resetting, restarting, etc.) components of the storage system (e.g. storage server) in the event the system encounters operational issues. In other words, the limited user account may restrict a user to operations associated with restarting or powering-on components of the storage system using the remote access controller 180. For example, if the server crashes or otherwise becomes offline, the limited user account may access the server, via the remote access controller 180, to initiate (or execute) operations (e.g. reboot) that allow the server to come back online or otherwise return to an operational state.

In 340, the configuration manager 175 may save the new user account configuration for the first server as part of a user account configuration profile. For example, the user account configuration profile may be saved as a configuration file. This configuration profile may then be propagated to additional servers to ensure the consistency of the retention lock compliance mode within the distributed storage environment. For example, access to remote access controllers 180 throughout the distributed environment may also be disabled (e.g. locked down). Accordingly, in 341, the configuration manager 175 may apply the user account configuration profile to a second server, or any remaining servers (or nodes) of the distributed storage environment that may include (or be associated with) a remote access controller 180. By applying the user account configuration profile to the second server, the second server may perform a similar (or the same) lockdown process as described above with respect to the first server. For example, applying the user account configuration profile to the second server (or any additional servers) may include the second sever creating a new root user account password, deleting any existing user accounts, and terminating any active user account sessions, for the remote access controller 180 corresponding to the second server. In addition, applying the user account configuration profile to the second server may also create a new administrative and a limited user account for the remote access controller 180 corresponding the second server. As described, the administrative user account and the limited user account may be subject to certain restrictions as described above. In other words, in some embodiments, the configuration manager 175 may configure additional servers for the retention lock compliance mode by applying the user account configuration profile to such servers.

In some embodiments, any updates to the user accounts of one or more remote access controllers 180 may be confirmed. For example, upon confirmation of the user account updates, the configuration manager 175 may provide an indication to the administrative user, via the interface 210, that the retention lock compliance mode has been configured. Accordingly, once the retention lock compliance mode has been configured, in 342, the administrative user may request that the retention lock compliance mode be enabled (or activated). In response to the request, in 344, the configuration manager 175 may obtain security officer credentials before enabling (or activating) the retention lock compliance mode in 346. By requesting the security officer credentials, the dual-party authentication requirement may be maintained. Once enabled, in 348, a notification may be received by the administrative user, via the interface 210, indicating the retention lock compliance mode has in fact been enabled (or activated).

In 350, the configuration manager 175 may monitor the distributed storage environment and enforce the consistency of the retention lock compliance mode across servers (or nodes) within the storage system. For example, the configuration manager 175 may update configuration settings in response to events that may modify retention lock compliance. Accordingly, in 352, the configuration manager 175 may apply (or reapply) the user account configuration profile to a particular server (or node). For example, if a new server (or node) is added or reintroduced to the storage system, the configuration manager 175 may apply the saved user account configuration profile to the added server (or node) to enforce the retention lock compliance mode across the system. As another example, if a server (or node) updates (or replaces, repairs, etc.) associated hardware, the configuration manager 175 may reapply the user account configuration profile to ensure the retention lock compliance is maintained by the server. For example, the configuration manager 175 may receive, from the remote access controller 180, that a component (e.g. motherboard) of the corresponding server has been replaced, and in response, the configuration manager 175 may reapply the saved user account configuration profile to the server.

In order to access the remote access controller 180 as an administrative user once the retention lock compliance mode is enabled, a dual-authentication may be required as further described with reference to FIG. 4.

Figure 4:
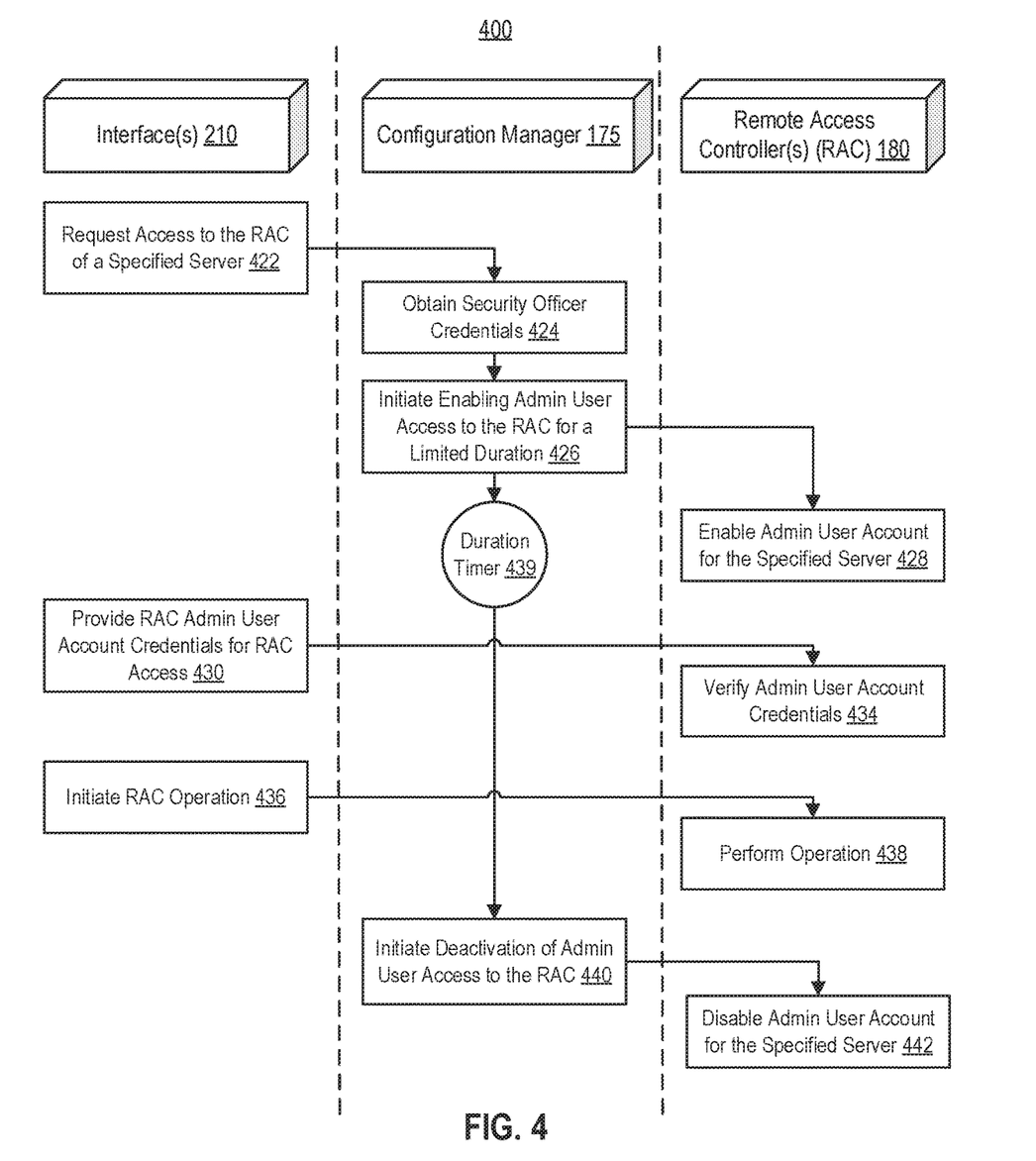
FIG. 4 is a process flow diagram illustrating an example of an interaction between components for providing access to a remote access controller when a retention lock compliance mode is enabled according to one or more embodiments of the disclosure.

FIG. 4 is a diagram 400 illustrating an example interaction between components for providing access to a remote access controller when a retention lock compliance mode is enabled according to one or more embodiments of the disclosure. As shown, enabling such access may involve an interaction between one or more interfaces 210, a configuration manger 175, and a remote access controller (RAC) 180. In some embodiments, the interface 210 may be provided by the configuration manager 175 to allow a newly created administrative user to access the remote access controller 180 once the retention lock compliance mode is activated.

Accordingly, as part of the process flow shown, in 422, a request to access the remote access controller of a specified server may be received. For example, an administrative user (e.g. first party) such as a storage administrator may specify a particular server and initiate the request to access the remote access controller 180 corresponding to the specified server. In some embodiments, the administrative user may provide such a request after providing the appropriate credentials (e.g. login information) to access the configuration manager 175. In response to requesting access to the remote access controller, in 424, the configuration manager 175 may obtain security officer (e.g. second party) credentials. Accordingly, the request may not be granted until the credentials of the security officer are verified, and thus, ensuring a dual-party authentication requirement is preserved. Once the security officer credentials are verified, in 426, the configuration manager 175 may initiate enabling administrative user access to the remote access controller. For example, an administrative user may be enabled for a limited duration. In some embodiments, the configuration manager 175 may send an instruction (e.g. via a service module 208) to the remote access controller 180, which then enables the administrative user account for the specified server in 428. Once the administrative user account is enabled, such an administrative user may attempt to access the remote access controller 180. In some embodiments, the administrative user of the remote access controller 180 may access the remote access controller 180 via the interface 210, which may be provided by the configuration manager 175. Thus, in 430, the administrative user may provide administrative user account credentials to access the remote access controller 180 via the interface 210. Once the remote access controller 180 (e.g. in conjunction with the configuration manager 175) verifies such credentials in 434, the administrative user may initiate various remote access controller operations in 436. For example, the operations may be initiated from the interface 210. In response, the remote access controller 180 may perform such operations in 438.

As described, the administrative user account may be enabled for a limited duration, and accordingly, in 439, the configuration manager 175 may maintain a duration timer for enabling the administrative user account. Accordingly, in 440, the configuration manager 175 may initiate deactivating the administrative user account once the limited duration is met (e.g. via service module 208). For example, if the limited duration is set for a period of 12 hours, the system may disable the administrative user account after 12 hours have elapsed. Thus, once the limited duration has elapsed, the remote access controller 180 may disable the administrative user account in 442. After disabling the administrative user account, the account may again be enabled by repeating the process described above (e.g. process of diagram 400).

FIG. 5 is a flow diagram 500 illustrating an example method of maintaining a dual-party authentication mechanism for accessing a remote access controller within a distributed storage environment according to one or more embodiments of the disclosure. Process 500 may use processing logic, which may include software, hardware, or a combination thereof. For example, process 500 may be performed by a system including one or more components (e.g. secondary storage system 170, configuration manager 175, storage system OS 212, storage server 195, etc.) described in operating environment 100.

In 501, the system may apply a retention lock to data stored by a storage system (e.g. secondary storage system 170). In some embodiments, the retention lock may require a dual-party authentication (e.g. CM authentication mechanism 231) to modify the data (e.g. data 161B). For example, the dual-party authentication may require credentials from a first authorized user (e.g. storage administrator 202) and a second authorized user (e.g. security officer 204).

As described, the storage system may be a configuration that includes a plurality of servers (e.g. storage server 195), and each of the servers may be associated with (e.g. include) a corresponding remote access controller (e.g. remote access controller 180). As described, the remote access controller may allow a third authorized user (e.g. currently existing system administrator 206) to modify a storage configuration associated with the storage system. For example, modifying a storage configuration (or settings, options, etc.) may include reconfiguring storage components, storage volumes, directories, files, or any information associated with (e.g. stored by) a particular server that may affect (e.g. modify, delete, cause files to become unreferenced, etc.) the data stored by the overall storage system. For example, deleting a storage volume maintained by (or associated with) a server may delete data of the overall storage system. In other words, allowing the third authorized user (or user account) to modify the storage configuration associated with the storage system may include allowing the third authorized user to perform operations (e.g. via the remote access controller) that cause data stored by the storage system to be deleted, or otherwise unreadable (or inaccessible).

In addition, in some embodiments, each server (e.g. storage server 195) may manage a set of storage components that store the data, and the remote access controller may include physical components that are distinct from components or resources of the server. For example, the remote access controller may execute on a separate processor than the one or more processors executing an operating system (e.g. storage system OS 212) of the server or storage system.

In some embodiments, the dual-party authentication mechanism for the retention lock may be administered by a configuration manager (e.g. configuration manager 175). For example, the configuration manager may work in conjunction with a filesystem of the storage system to administer the dual-party authentication mechanism. In some embodiments, an authentication mechanism (RAC authentication mechanism 232) for the remote access controller may be administered by components of the remote access controller independent of the filesystem or OS. For example, in some embodiments, the remote access controller may execute on a separate processor (or CPU) than the one or more processors executing the operating system of the storage system. In some embodiments, the authentication mechanism of the remote access controller may be administered (or provided, managed, etc.) by a baseboard management controller (BMC) associated with (or providing) the remote access controller. Accordingly, the remote access controller may be part of a BMC of a server (or node) within the storage system.

In 502, the system may receive, from the first authorized user (or user account), a request to enable a retention lock compliance mode for the plurality of servers. In some embodiments, the request may be provided via an interface (e.g. interface 210).

In 503, the system may confirm credentials from the second authorized user (e.g. security officer 204), in response to the request to enable the retention lock compliance mode. As described, credentials may include a password, biometric, key, certificate, or any other form of secure information verifying the identity (or authorization) of the user (or user account). In some embodiments, the second authorized user (or user account) may be different than the first and third authorized user (or user account). For example, the first authorized user may be a storage administrator, and the third authorized user may be a system administrator, which may be the same person as the storage administrator. However, the second authorized user may be a security officer to provide a degree of oversight or supervisory authority, and therefore, would be a different user (or person) than the first and third user.

In some embodiments, the system may also obtain configuration information for one or more new user accounts associated with the remote access controller. In some embodiments, the one or more user accounts may include an administrative user account and a limited user account. For example, the limited user account may restrict a user to operations associated with restarting or powering-on the storage system using the remote access controller.

In 504, the system may disable existing (or previous) user accounts associated with the remote access controller corresponding to a first server. In some embodiments, the first server may be a management server, and a configuration manager (e.g. configuration manager 175) may be part of the management server. For example, the management server may be responsible (or manage, authorize, configure, etc.) for adding additional servers (or nodes) to the storage system. In some embodiments, the configuration manager may execute (e.g. be embedded) on one or more nodes (e.g. processors or servers) of a distributed (or clustered) storage environment to maintain a high degree of availability and provide the ability to continue operating if one or more nodes fail. In addition, in some embodiments, the configuration manager may execute on one or more dedicated nodes that are distinct from nodes that are part of a storage filesystem.

The existing user accounts may include an account (e.g. previous system administrator account) associated with the third authorized user. The system may also terminate any active user account sessions (or logins) associated with the remote access controller (e.g. active user account connections to the remote access controller). Accordingly, disabling the existing user accounts may also include resetting a root password for the remote access controller, deleting the existing user accounts associated with the remote access controller, and terminating any active user account sessions associated with the remote access controller. In addition, in some embodiments, the root user password may be reset periodically once the retention lock compliance mode is activated (or enabled).

In 505, the system may create the administrative user account and the limited user account for the remote access controller corresponding to the first server. In some embodiments, the administrative user account may be set to a disabled state, and the limited user account may be set to an enabled state. For example, if an operating system of the storage system crashes, the limited user account may initiate a rebooting of the storage system without requiring a dual-authentication because the limited user does not have access to operations that may directly compromise the integrity of the retained data.

In 506, the system may save a user account configuration profile associated with the remote access controller corresponding to the first server. In some embodiments, the system may save the user account configuration profile (or configuration file) in response to creating the administrative user account and/or the limited user account for the remote access controller corresponding to the first server.

In 507, the system may apply the saved user account configuration profile to at least a second server. For example, applying the user account configuration profile to the second server may reset or enable placing (or setting) the second server into a retention lock compliance mode. For example, applying the user account configuration profile to the second server may reset a root user password, disable existing user accounts, and create the administrative user account and the limited user account, associated with the remote access controller corresponding to the second server (or node). Applying the user account configuration profile may also terminate any active user sessions connected to the remote access controller corresponding to the second server.

Accordingly, the configuration profile (or configuration file) allows propagating the process of resetting existing user accounts to other servers or nodes within the storage system in an efficient manner. In some embodiments, before applying the user account configuration profile, to additional servers, system may again confirm credentials from the second authorized user.

In 508, the system may activate the retention lock compliance mode for the first server and at least the second server (or any remaining servers). Accordingly, in some embodiments, activating the retention lock compliance mode requires the dual-party authentication to access either of the remote access controllers corresponding to the first server or the second server.

As described, the configuration manager may ensure the consistency of the retention lock compliance mode across the distributed storage environment. For example, the configuration manager may apply the saved user account configuration profile to a third server, in response to determining the third server has been added to the storage system. Determining that the third server has been added to the storage system may include determining that the third server has been added to the system as a new node, as well reincorporating a previously existing node that was taken offline. For example, a node may be taken offline for maintenance and reintroduced into the system. Accordingly, applying the configuration profile to the third server may disable existing user accounts associated with the remote access controller corresponding to the third server and create the administrative user account and the limited user account. In addition, the configuration manager may receive, from the remote access controller corresponding to the second server, a notification that a component of the second server has been replaced (or modified, updated, etc.). For example, the component may include a motherboard of the second server. Accordingly, the configuration manager may reapply the saved user account configuration profile to the second server, in response to the notification that the component of the second server has been replaced.

Figure 6:
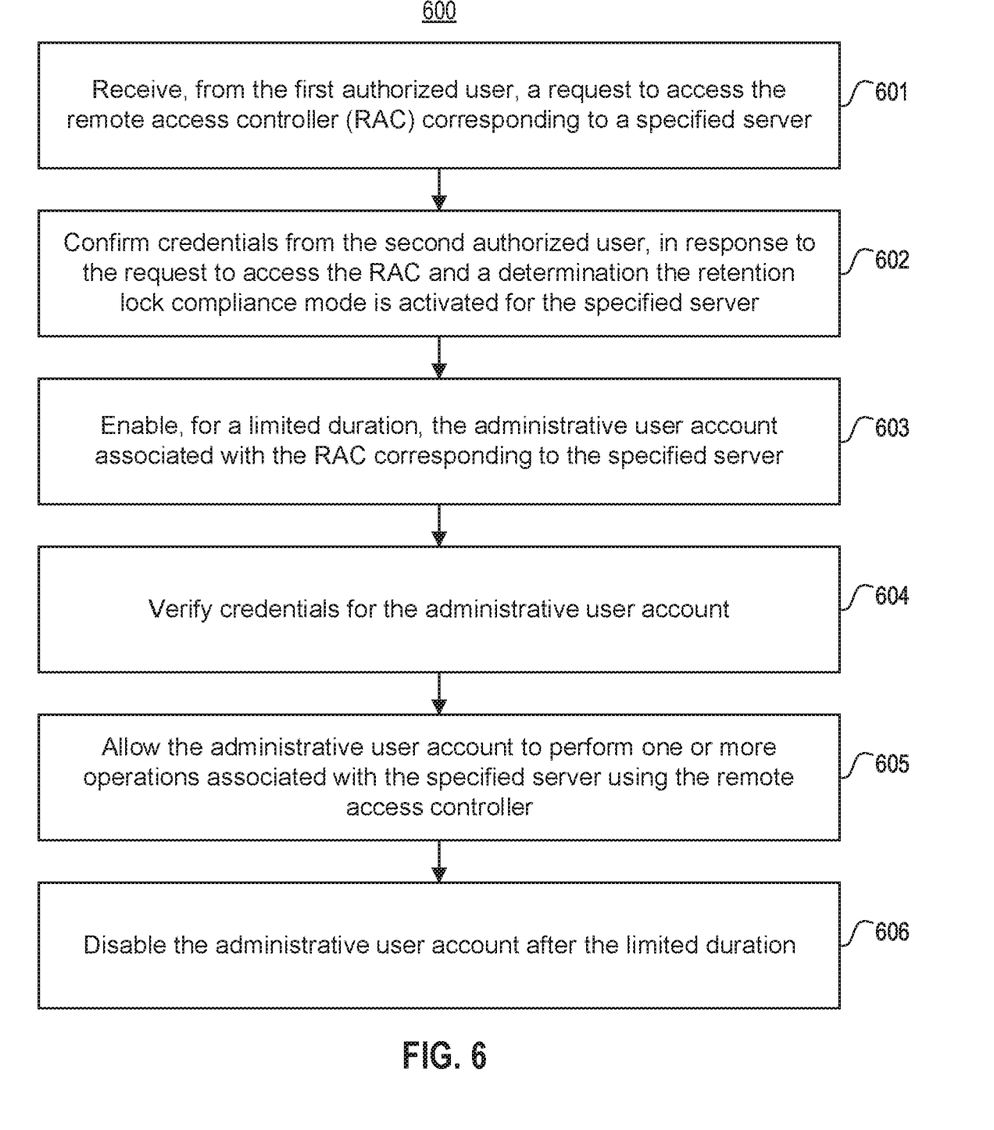
FIG. 6 is a flow diagram illustrating an example method of enabling an administrative user account associated with a remote access controller by providing a dual-party authentication according to one or more embodiments of the disclosure.

FIG. 6 is a flow diagram 600 illustrating an example method of enabling an administrative user account associated with a remote access controller by providing a dual-party authentication according to one or more embodiments of the disclosure. Process 600 may use processing logic, which may include software, hardware, or a combination thereof. For example, process 600 may be performed by a system including one or more components (e.g. secondary storage system 170, configuration manager 175, storage system OS 212, storage server 195, etc.) described in operating environment 100.

In 601, the system may receive, from the first authorized user (e.g. storage administrator 202), a request to access the remote access controller corresponding to a specified server of the plurality of servers. For example, the request may be provided via an interface (e.g. interface 210) that also enables the user to specify the particular server associated with the remote access controller to be accessed.

In 602, the system may confirm credentials from the second authorized user (e.g. security officer 204), in response to the request to access the remote access controller and a determination the retention lock compliance mode is activated (or enabled). For example, dual-party authentication may be preserved when the system determines the retention lock compliance mode is activated.

In 603, the system may enable, for a limited duration, the administrative user account associated with the remote access controller corresponding to the specified server. For example, the system may send an instruction via a service module (e.g. service module 208) to the remote access controller of the specified server to enable the administrative user account.

In 604, the system may verify credentials for the administrative user account. For example, the credentials may have been specified during the creation of the new user accounts for the remote access controller. In some embodiments, the credentials of the newly created administrative user may be verified using an interface provided by the configuration manager.

In 605, the system may allow the administrative user account to perform one or more operations on the specified server using the remote access controller. For example, the administrative user account may be authorized to perform an expanded set of operations that may be performed by the remote access controller because the dual-party authentication requirement has been maintained. For example, the administrative user account may be authorized to perform remote access controller operations related to managing server hardware such as operations required to service or replace disk drives, motherboards, and additional components such as field/customer replaceable units (FRU/CRU). However, to further secure the system, the administrative user account may be limited with respect to certain operations. For example, the administrative user account may not be authorized to perform certain user management operations such as creating new user accounts, and updating or deleting existing user accounts associated with the remote access controller. In addition, in some embodiments, performing operations using the remote access controller as an administrative user may also require authorization from the second authorized user (e.g. security officer 204).

In 606, the system may disable the administrative user account after the limited duration. For example, if the limited duration is set for a period of 12 hours, the system may disable the administrative user account after 12 hours have elapsed (or expired).

Accordingly, in some embodiments, the methods ensure a dual-party authentication requirement is preserved throughout aspects of the distributed storage environment to maintain data retention compliance.

Figure 7:
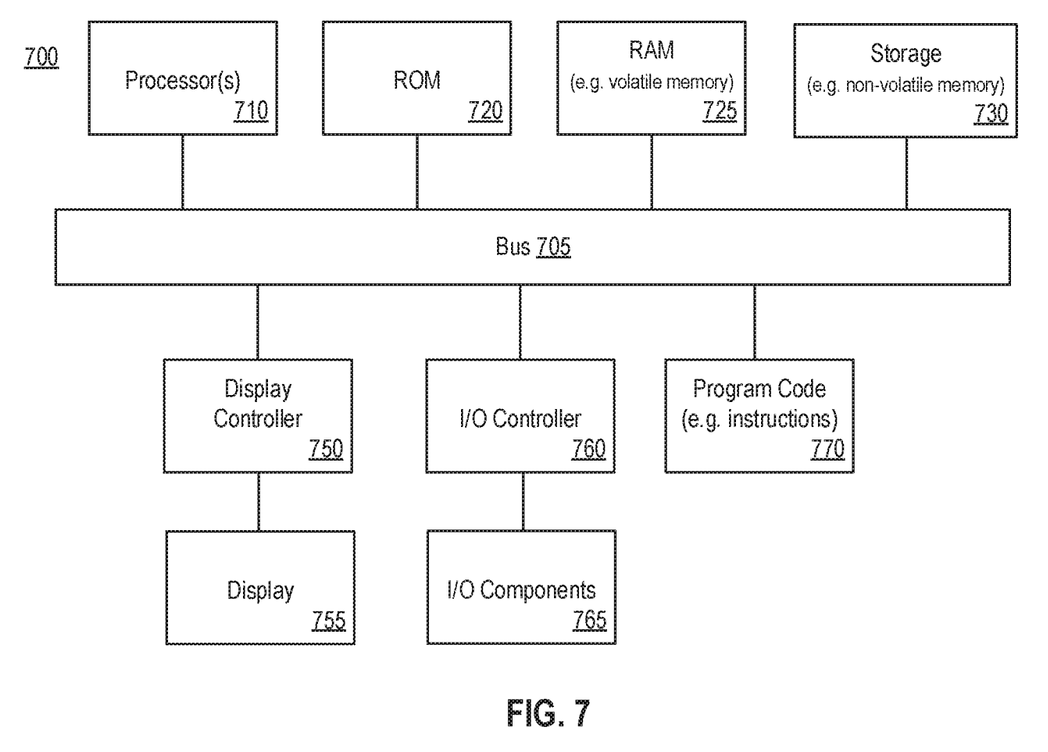
FIG. 7 is a block diagram illustrating an example computing system that may be used in conjunction with one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems (e.g. secondary storage system 170, configuration manager 175, storage system OS 212, storage server 195, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. configuration manager 175, storage system OS 212, etc.). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
apply a retention lock to data stored by a storage system, the retention lock requiring a dual-party authentication to modify the data, the dual-party authentication requiring credentials from a first authorized user and a second authorized user, the storage system including a plurality of servers each associated with a corresponding remote access controller that allows a third authorized user to modify a storage configuration associated with the storage system;
receive, from the first authorized user, a request to enable a retention lock compliance mode for the plurality of servers;
confirm credentials from the second authorized user, in response to the request to enable the retention lock compliance mode;
disable, by a configuration manager, existing user accounts associated with the remote access controller corresponding to a first server, the existing user accounts including an account associated with the third authorized user;
create, by the configuration manager, an administrative user account and a limited user account for the remote access controller corresponding to the first server, the administrative user account set to a disabled state and the limited user account set to an enabled state;
save, by the configuration manager, a user account configuration profile associated with the remote access controller corresponding to the first server;
apply, by the configuration manager, the saved user account configuration profile to at least a second server to disable existing user accounts associated with the remote access controller corresponding to the second server and create the administrative user account and the limited user account; and activate the retention lock compliance mode for the first server and the second server, the retention lock compliance mode requiring the dual-party authentication to access either of the remote access controllers corresponding to the first server or the second server.

2. The system of claim 1, wherein the first server is a management server for the storage system and the configuration manager is part of the management server.

3. The system of claim 1, wherein the plurality of instructions, when executed, further cause the one or more processors to:

receive, by the configuration manager and from the remote access controller corresponding to the second server, a notification that a motherboard of the second server has been replaced; and reapply, by the configuration manager, the saved user account configuration profile to the second server, in response to the notification that the motherboard of the second server has been replaced.

4. The system of claim 1, wherein the plurality of instructions, when executed, further cause the one or more processors to:

apply, by the configuration manager, the saved user account configuration profile to a third server, in response to determining the third server has been added to the storage system.

5. The system of claim 1, wherein the plurality of instructions, when executed, further cause the one or more processors to:

receive, from the first authorized user, a request to access the remote access controller corresponding to a specified server of the plurality of servers;

confirm credentials from the second authorized user, in response to the request to access the remote access controller and a determination the retention lock compliance mode is activated for the specified server;

enable, for a limited duration, the administrative user account associated with the remote access controller corresponding to the specified server;

verify credentials for the administrative user account;

allow the administrative user account to perform one or more operations associated with the specified server using the remote access controller; and disable the administrative user account after the limited duration.

6. The system of claim 1, wherein the dual-party authentication mechanism for the retention lock is administered by a filesystem of the storage system, and an authentication mechanism for the remote access controller is administered by components of the remote access controller independent of the filesystem.

7. The system of claim 1, wherein the remote access controller includes one or more physical components associated with the corresponding server, and the remote access controller executes on a separate processor than the one or more processors executing an operating system of the corresponding server.

8. The system of claim 1, wherein disabling existing user accounts associated with the remote access controller includes:

resetting a root user password for the remote access controller;

deleting the existing user accounts associated with the remote access controller; and terminating any active user account sessions associated with the remote access controller.

9. A method comprising:

applying a retention lock to data stored by a storage system, the retention lock requiring a dual-party authentication to modify the data, the dual-party authentication requiring credentials from a first authorized user and a second authorized user, the storage system including a plurality of servers each associated with a corresponding remote access controller that allows a third authorized user to modify a storage configuration associated with the storage system;

receiving, from the first authorized user, a request to enable a retention lock compliance mode for the plurality of servers;

confirming credentials from the second authorized user, in response to the request to enable the retention lock compliance mode;

disabling, by a configuration manager, existing user accounts associated with the remote access controller corresponding to a first server, the existing user accounts including an account associated with the third authorized user;

creating, by the configuration manager, an administrative user account and a limited user account for the remote access controller corresponding to the first server, the administrative user account set to a disabled state and the limited user account set to an enabled state;

saving, by the configuration manager, a user account configuration profile associated with the remote access controller corresponding to the first server;

applying, by the configuration manager, the saved user account configuration profile to at least a second server to disable existing user accounts associated with the remote access controller corresponding to the second server and create the administrative user account and the limited user account; and activating the retention lock compliance mode for the first server and the second server, the retention lock compliance mode requiring the dual-party authentication to access either of the remote access controllers corresponding to the first server or the second server.

10. The method of claim 9, wherein the first server is a management server for the storage system and the configuration manager is part of the management server.

11. The method of claim 9, further comprising:

receiving, by the configuration manager and from the remote access controller corresponding to the second server, a notification that a motherboard of the second server has been replaced; and reapplying, by the configuration manager, the saved user account configuration profile to the second server, in response to the notification that the motherboard of the second server has been replaced.

12. The method of claim 9, further comprising:

applying, by the configuration manager, the saved user account configuration profile to a third server, in response to determining the third server has been added to the storage system.

13. The method of claim 9, further comprising:

receiving, from the first authorized user, a request to access the remote access controller corresponding to a specified server of the plurality of servers;

confirming credentials from the second authorized user, in response to the request to access the remote access controller and a determination the retention lock compliance mode is activated for the specified server;

enabling, for a limited duration, the administrative user account associated with the remote access controller corresponding to the specified server;
verifying credentials for the administrative user account;
allowing the administrative user account to perform one or more operations associated with the specified server using the remote access controller; and
disabling the administrative user account after the limited duration.

14. The method of claim 9, wherein the dual-party authentication mechanism for the retention lock is administered by a filesystem of the storage system, and an authentication mechanism for the remote access controller is administered by components of the remote access controller independent of the filesystem.

15. A computer program product comprising a non-transitory computer-readable medium having a computer-readable program code embodied therein to be executed by one or more processors, the program code including instructions to:
apply a retention lock to data stored by a storage system, the retention lock requiring a dual-party authentication to modify the data, the dual-party authentication requiring credentials from a first authorized user and a second authorized user, the storage system including a plurality of servers each associated with a corresponding remote access controller that allows a third authorized user to modify a storage configuration associated with the storage system;
receive, from the first authorized user, a request to enable a retention lock compliance mode for the plurality of servers;
confirm credentials from the second authorized user, in response to the request to enable the retention lock compliance mode;
disable, by a configuration manager, existing user accounts associated with the remote access controller corresponding to a first server, the existing user accounts including an account associated with the third authorized user;
create, by the configuration manager, an administrative user account and a limited user account for the remote access controller corresponding to the first server, the administrative user account set to a disabled state and the limited user account set to an enabled state;
save, by the configuration manager, a user account configuration profile associated with the remote access controller corresponding to the first server;
apply, by the configuration manager, the saved user account configuration profile to at least a second server to disable existing user accounts associated with the remote access controller corresponding to the second server and create the administrative user account and the limited user account; and
activate the retention lock compliance mode for the first server and the second server, the retention lock compliance mode requiring the dual-party authentication to access either of the remote access controllers corresponding to the first server or the second server.

16. The computer program product of claim 15, wherein the first server is a management server for the storage system and the configuration manager is part of the management server.

17. The computer program product of claim 15, wherein the program code includes further instructions to:
receive, by the configuration manager and from the remote access controller corresponding to the second server, a notification that a motherboard of the second server has been replaced; and
reapply, by the configuration manager, the saved user account configuration profile to the second server, in response to the notification that the motherboard of the second server has been replaced.

18. The computer program product of claim 15, wherein the program code includes further instructions to:
apply, by the configuration manager, the saved user account configuration profile to a third server, in response to determining the third server has been added to the storage system.

19. The computer program product of claim 15, wherein the program code includes further instructions to:
receive, from the first authorized user, a request to access the remote access controller corresponding to a specified server of the plurality of servers;
confirm credentials from the second authorized user, in response to the request to access the remote access controller and a determination the retention lock compliance mode is activated for the specified server;
enable, for a limited duration, the administrative user account associated with the remote access controller corresponding to the specified server;
verify credentials for the administrative user account;
allow the administrative user account to perform one or more operations associated with the specified server using the remote access controller; and
disable the administrative user account after the limited duration.

20. The computer program product of claim 15, wherein the dual-party authentication mechanism for the retention lock is administered by a filesystem of the storage system, and an authentication mechanism for the remote access controller is administered by components of the remote access controller independent of the filesystem.

* * * * *